United States Patent
Geadelmann et al.

(10) Patent No.: US 9,528,716 B2
(45) Date of Patent: Dec. 27, 2016

(54) FAN COIL THERMOSTAT WITH ACTIVITY SENSING

(71) Applicant: Honeywell International Inc., Morristown, NJ (US)

(72) Inventors: Levi H. Geadelmann, Edina, MN (US); Daniel J. Sullivan, St. Anthony, MN (US)

(73) Assignee: Honeywell International Inc., Morris Plains, NJ (US)

( * ) Notice: Subject to any disclaimer, the term of this patent is extended or adjusted under 35 U.S.C. 154(b) by 111 days.

(21) Appl. No.: 14/637,137

(22) Filed: Mar. 3, 2015

(65) Prior Publication Data

US 2015/0176855 A1 Jun. 25, 2015

Related U.S. Application Data

(63) Continuation of application No. 11/833,670, filed on Aug. 3, 2007, now Pat. No. 9,182,141.

(51) Int. Cl.
*F24F 11/00* (2006.01)
*F24F 1/00* (2011.01)
(Continued)

(52) U.S. Cl.
CPC ....... *F24F 11/0034* (2013.01); *F24D 19/1084* (2013.01); *F24F 1/0007* (2013.01);
(Continued)

(58) Field of Classification Search
CPC ............... F24F 11/0034; F24F 11/0079; F24F 2011/0093; F24F 2011/0075; F24F 2011/0073; F24D 19/1084; G05D 23/1904; Y02B 30/746
See application file for complete search history.

(56) References Cited

U.S. PATENT DOCUMENTS 3,653,589 A 4/1972 McGrath
3,653,590 A 4/1972 Eisea
(Continued)

OTHER PUBLICATIONS

City of Berkeley CECO (Commercial Energy Conservation Ordinance), 12 pages, prior to Aug. 3, 2007.
(Continued)

*Primary Examiner* — Emmanuel Duke
(74) *Attorney, Agent, or Firm* — Seager, Tufte & Wickhem, LLP

(57) ABSTRACT

Fan coil thermostats can provide energy savings by, for example, not unnecessarily heating and/or cooling an unoccupied room or other space. Fan coil systems employing such a fan coil thermostat may be more energy efficient. A fan coil system may include a fan coil that is configured for fluid communication with a source of heated fluid and/or a source of cooled fluid, a valve that controls fluid flow through the fan coil, a fan that blows air across the fan coil and a fan coil thermostat. The fan coil thermostat may include a controller that implements a control algorithm that may include an unoccupied temperature setting. The controller may be programmed to permit a user to enter a user-chosen temperature setting. In response, the controller may initiate a timer, and may automatically return to the unoccupied temperature setting once the timer has expired.

20 Claims, 4 Drawing Sheets

(51) Int. Cl.
*G05D 23/19* (2006.01)
*F24D 19/10* (2006.01)

(52) U.S. Cl.
CPC ........ *F24F 11/006* (2013.01); *F24F 11/0012* (2013.01); *F24F 11/0079* (2013.01); *F24F 11/0086* (2013.01); *G05D 23/1904* (2013.01); F24F 2011/0073 (2013.01); F24F 2011/0075 (2013.01); F24F 2011/0093 (2013.01); Y02B 30/746 (2013.01)

(56) References Cited

U.S. PATENT DOCUMENTS

| | | | |
|---|---|---|---|
| 3,674,203 | A | 7/1972 | McGrath |
| 3,684,170 | A | 8/1972 | Roof |
| 3,945,432 | A | 3/1976 | Tamblyn |
| 4,049,044 | A | 9/1977 | Cohen |
| 4,060,123 | A | 11/1977 | Hoffman et al. |
| 4,333,316 | A | 6/1982 | Stamp, Jr. et al. |
| 4,403,646 | A | 9/1983 | Fodera |
| 4,531,454 | A | 7/1985 | Spoormaker |
| 4,639,709 | A | 1/1987 | Koets |
| 4,675,828 | A | 6/1987 | Winston |
| 4,754,607 | A | 7/1988 | Mackay |
| 4,824,013 | A | 4/1989 | Gouldey |
| 4,918,615 | A | 4/1990 | Suzuki et al. |
| 5,024,379 | A | 6/1991 | Dempsey |
| 5,101,639 | A | 4/1992 | Wruck et al. |
| 5,123,592 | A | 6/1992 | Desmarais et al. |
| 5,131,236 | A | 7/1992 | Wruck et al. |
| 5,133,193 | A | 7/1992 | Wruck et al. |
| 5,138,842 | A | 8/1992 | Wruck et al. |
| 5,167,366 | A | 12/1992 | Desmarais et al. |
| 5,170,635 | A | 12/1992 | Wruck et al. |
| 5,172,565 | A | 12/1992 | Wruck et al. |
| 5,173,843 | A | 12/1992 | Rowlette et al. |
| 5,183,102 | A | 2/1993 | Clark |
| 5,210,477 | A | 5/1993 | Rowlette |
| 5,305,952 | A | 4/1994 | Hannarong |
| 5,318,224 | A | 6/1994 | Darby et al. |
| 5,397,970 | A | 3/1995 | Rowlette et al. |
| 5,460,221 | A * | 10/1995 | Stalsberg ............ F24D 19/1009 165/259 |
| 5,476,221 | A | 12/1995 | Seymour |
| 5,492,273 | A | 2/1996 | Shah |
| 5,592,058 | A | 1/1997 | Archer et al. |
| 5,592,989 | A * | 1/1997 | Lynn ................ G05D 23/1902 165/259 |
| 5,682,949 | A | 11/1997 | Ratcliffe et al. |
| 5,718,372 | A | 2/1998 | Tishler |
| 5,727,395 | A | 3/1998 | Guo et al. |
| 5,737,934 | A | 4/1998 | Shah |
| 5,797,273 | A | 8/1998 | Guo et al. |
| 5,797,717 | A | 8/1998 | Tanaka et al. |
| 5,819,840 | A | 10/1998 | Wilson et al. |
| 6,134,134 | A * | 10/2000 | Dushane ............ G05D 23/1904 165/259 |
| 2003/0149576 | A1 | 8/2003 | Sunyich |
| 2005/0119766 | A1 | 6/2005 | Amundson et al. |
| 2006/0231246 | A1* | 10/2006 | Roskewich .......... F24F 11/0086 165/303 |
| 2007/0084939 | A1* | 4/2007 | Liu ...................... B64D 13/00 236/91 D |
| 2009/0032605 | A1 | 2/2009 | Sullivan et al. |

OTHER PUBLICATIONS

Guestat, Digital Thermostat, Installation Instructions, 35 pages, Oct. 2003.
Honeywell International Inc., "T7350 Commercial Programmable Thermostat," Product Data, 32 pages, Apr. 2004.
http://www.thisisbroken.com/b/2005/07/chancery_court_.html, "This is Broken—Hotel Thermometer," 8 pages, printed May 24, 2007.
Line Voltage Premier Series, Installation and Operating Instructions, 8 pages, Dec. 1.
PECO, T155 Auto/Manual Changeover Thermostat, 2 pages, 2005.
PECO, T170 Commercial Thermostat, 2 pages, 2005.
PECO, T170 Commercial Thermostat, Continuous or Cycling Fan, 1 page, 2005.
PECO, T170 Hospitality Thermostat, Application Guide, 1 page, Jan. 19, 2006.
PECO, T170 Thermostat, 24 VAC/120-277 VAC On/Off Control, 2 pages, 2005.
PECO, T170/S200 Application Guide, 2 pages, prior to Aug. 3, 2007.
PECO, TA155 Thermostat, Manual Changeover, 1 page, 2005.
SST-1 Heating and Cooling with Automatic Changeover, Operating Instructions, 2 pages, prior to Aug. 3, 2007.
XCI Corporation, "Application Note: Hotel/Motel Energy Management," 3 pages, 1997-1998.

* cited by examiner

FAN COIL THERMOSTAT WITH ACTIVITY SENSING

This application is a continuation application of U.S. patent application Ser. No. 11/833,670, filed Aug. 3, 2007, and entitled "FAN COIL THERMOSTAT WITH ACTIVITY SENSING", which is incorporated herein by reference.

TECHNICAL FIELD

The present disclosure pertains generally to thermostats and more particularly to thermostats adapted for use with fan coils.

BACKGROUND

A variety of buildings such as hotels, apartment buildings and the like are heated and cooled using fan coil systems. In a fan coil system, a heat transfer fluid such as water is pumped or otherwise forced through a fan coil. A fan is used to blow air across the fan coil. If the heat transfer fluid was heated, heated air will blow out of the fan coil system. Conversely, if the heat transfer fluid was cooled, cool air will blow out of the fan coil system.

Like other HVAC systems, fan coil systems often consume significant amounts of energy. For many buildings, such as hotels and other structures, a number of rooms may, at any given time, be unoccupied. A significant amount of energy may be saved by controlling unoccupied rooms or spaces to an energy savings setback temperature, rather than a comfort temperature.

SUMMARY

The present disclosure pertains to a fan coil thermostat that can provide energy savings by, for example, not unnecessarily heating and/or cooling an unoccupied room or other space, while still providing comfort to the occupants when the room is occupied. Fan coil systems employing such a fan coil thermostat may be more energy efficient.

In an illustrative but non-limiting example, a fan coil thermostat may be configured for use with a fan coil system. In some cases, the fan coil system may include a fan coil that is configured for fluid communication with a source of heated fluid and/or a source of cooled fluid, a valve that controls fluid flow through the fan coil, and a fan that blows air across the fan coil.

The fan coil thermostat may include a controller that implements a control algorithm that is adapted to at least partially control one or more components of the fan coil system, and that may include an unoccupied temperature setting. The fan coil thermostat may include a timer. A user interface may include one or more buttons and may be adapted to provide a signal to the controller when one or more of the buttons are operated, thereby providing the controller with a user-chosen temperature setting as well as an indication of occupancy. In response, the controller may initiate a timer, and may automatically return to the unoccupied temperature setting once the timer expires.

The above summary is not intended to describe each disclosed embodiment or every implementation of the present invention. The Figures and Detailed Description that follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
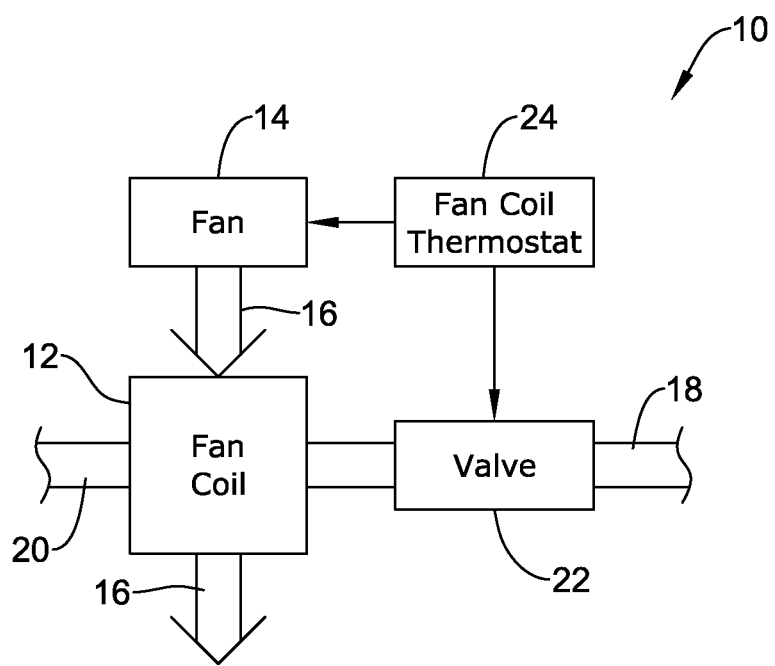
FIG. 1 is a schematic view of an illustrative but non-limiting fan coil system.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials may be illustrated for the various elements, those skilled in the art will recognize that many of the examples provided have suitable alternatives that may be utilized.

FIG. 1 is a schematic view of an illustrative but non-limiting fan coil system 10. While fan coil system 10 is schematically shown as a two-pipe fan coil system including a single supply line and a single return line, it will be appreciated that fan coil system 10 may instead be a four-pipe fan coil system having heated water supply and return lines as well as cooled water supply and return lines. In some cases, a four-pipe system may include a single fan coil while in other cases, a four-pipe system may include two fan coils, with one dedicated to heated and one dedicated to cooling. In a two-pipe fan coil system, the single supply line may, for example, provide heated water during the heating season and may provide cooled water during the cooling season.

The illustrative fan coil system 10 includes a fan coil 12. Fan coil 12 is a heat exchanger through which heated or cooled fluid flows. A fan 14 blows air across fan coil 12 as schematically shown by arrows 16. In some cases, fan 14 pulls ambient air from within the space and/or from outside the building. The ambient air is then heated or cooled by the fan coil 12 and provided into the space. In some cases, fan coil system 10 may be disposed within a housing (not shown) having a first vent or opening upstream of fan 14 and a second vent or opening downstream of fan coil 12. Fan 14 may pull air through the first vent or opening and then exhaust the heated or cooled air through the second vent or opening and into the space. The components may be arranged either horizontally or vertically within such a housing, as desired or perhaps as dictated by space considerations.

In order to accommodate fluid flow through fan coil 12, fan coil system 10 may include a supply line 18 and a return line 20. During the heating season, supply line 18 provides a source of heated fluid (such as water) from a suitable source such as a boiler or water heater, geothermal and/or the like. During the cooling season, supply line 18 may provide a source of cooled fluid (such as water) from a suitable source such as an evaporative cooling tower or the like.

In the illustrative embodiment, a valve 22 is disposed within supply line 18, upstream of fan coil 12, in order to control fluid flow through fan coil 12. In some cases, valve 22 may provide binary, i.e., on/off control while in other cases it is contemplated that valve 22 may be configured to provide a plurality of flow rates into fan coil 12.

Fan coil system 10 may include a fan coil thermostat 24 that controls operation of valve 22 and/or operation of fan 14 in order to achieve a desired temperature level within a space that is conditioned by fan coil system 10. In some cases, while a fan coil thermostat 24 may be capable of storing a temperature setting such as an unoccupied temperature setting or perhaps a temporary temperature setting, the illustrative fan coil thermostat 24 is not configured or adapted to accommodate any other programmed temperature setback information such as a temperature setback schedule that pertains to differing temperature set points corresponding to particular periods of time during a day and/or week. In other words, the illustrative fan coil thermostat 24 may be adapted to operate only at the unoccupied temperature setting or temporarily at a user-chosen temperature setting. In other illustrative embodiments, the fan coil thermostat 24 may be a fully programmable thermostat that may include a temperature schedule that has programmable temperature set points for programmable periods of time during, for example, a day, days and/or a week, as desired.

Figure 2:
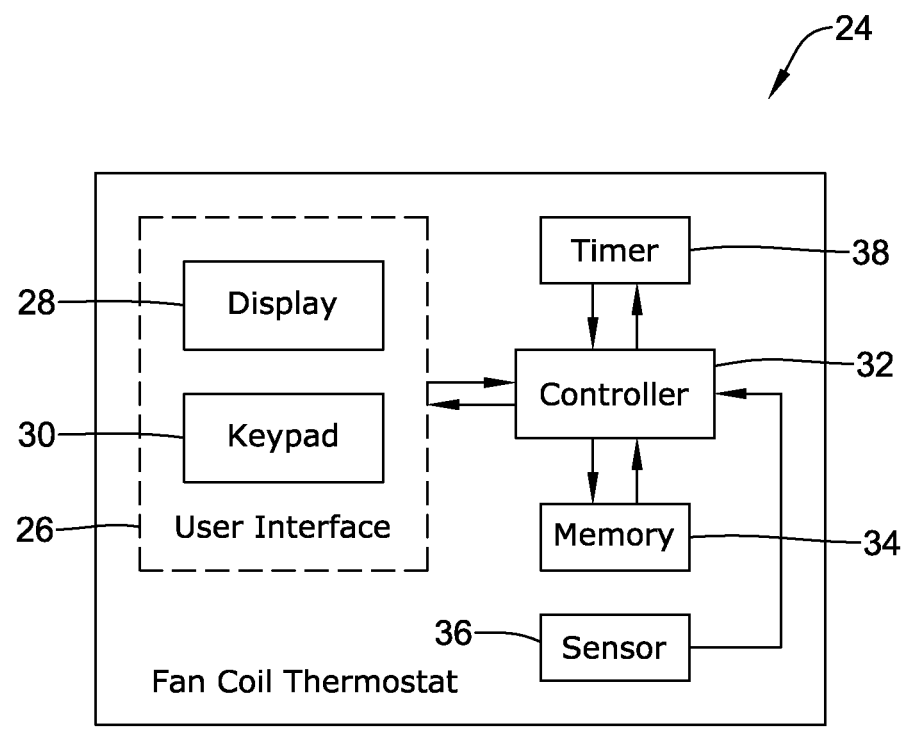
FIG. 2 is a schematic view of an illustrative but non-limiting fan coil thermostat as may be used in the fan coil system of FIG. 1.

The illustrative fan coil thermostat 24 is better described with respect to FIG. 2. FIG. 2 schematically shows various components of an illustrative fan coil thermostat 24. Fan coil thermostat 24 includes a user interface 26 that may include a display 28 and a keypad 30. Display 28 may be any suitable alphanumeric display medium that is capable of displaying visually discernible information. In some cases, display 28 may be a liquid crystal display (LCD), but this is not required. Keypad 30 may include one or more individual electromechanical buttons such as an on/off button, a temperature up button, a temperature down button, a fan speed up button, a fan speed down button, and the like. In some cases, it is contemplated that user interface 26 may be a touch screen LCD that encompasses the function of display 28 as well as keypad 30. That is, the buttons of keypad 30 may include, for example, electromechanical buttons, soft buttons, and/or touch regions on a touch screen display, as desired.

The illustrative fan coil thermostat 24 also includes a controller 32. In some cases, controller 32 may implement a control algorithm that is adapted to at least partially control one or more components of fan coil system 10. The controller algorithm may also include an unoccupied temperature setting. In some cases, the unoccupied temperature setting may be a temperature set point that is chosen to conserve energy. This temperature set point may include one or both of a heating temperature set point and/or a cooling temperature set point. These temperature set points may, for example, be determined and set during installation of fan coil thermostat 24, or may be determined and set subsequent to installation by a contractor or other person. In one example, an unoccupied heating temperature setting may be set to 62° F., and an unoccupied cooling temperature setting may be set to 85° F. These temperatures, which are merely illustrative, represent temperatures that may be maintained by fan coil system 10 (FIG. 1) when a particular space is unoccupied.

Controller 32 may be adapted to provide information to and/or receive information from user interface 26. Controller 32 may, for example, display a current temperature and/or a current temperature set point on display 28. Other examples of information that may be provided by controller 32 include a current fan speed, equipment status (on/off), current time, and the like. Examples of information that may be received from keypad 28 may include changes in a temperature set point, changes in fan speed and/or status, and the like.

In some cases, fan coil thermostat 24 may include a memory block 34. Memory block 34 may be used to, for example, store one or more unoccupied temperature settings, a current temperature set point, and/or programming that instructs controller 32 how to regulate valve 22 (FIG. 1) and/or fan 14 (FIG. 1) in order to obtain and maintain a particular temperature set point. In some cases, memory block 34 may store, for example, the aforementioned control algorithm.

In some instances, fan coil thermostat 24 may include a sensor 36 that provides controller 32 with information pertaining to current sensed conditions within a space conditioned by fan coil system 10 (FIG. 1). Sensor 36 may be a temperature sensor, a humidity sensor and/or any other suitable sensor, as desired. In some cases, sensor 36 may be located internally to fan coil thermostat 24, although in some instances, sensor 36 may instead be located remotely from fan coil thermostat 24.

Fan coil thermostat 24 may include a timer 38. In some cases, timer 38 may be an electromechanical timer while in other instances timer 38 may be an electronic timer or may even be manifested in programming run by controller 32. In some instances, if a user operates one or more buttons of keypad 30, such as changing a temperature set point or perhaps changing the speed of fan 14 (FIG. 1), user interface 26 may provide a signal to controller 32 that provides controller 32 with a user-chosen temperature or perhaps a manually-selected fan speed setting. From this, controller 32 may also determine an indication of occupancy. i.e., that someone is in the space. In response, controller 32 may temporarily change the temperature set point from the unoccupied temperature setting to the user-chosen temperature setting, and/or change the fan speed setting to a manually-selected fan speed setting. Controller 32 may also initiate timer 38. The timer 38 may be adapted to expire at the end of a predetermined or other time period.

Once the timer 38 expires, and in some cases absent any intervening detected interaction by the user via the user interface 26, controller 32 may automatically change the temperature set point back to the unoccupied temperature setting.

The predetermined time period of the timer 38 may be any suitable time period. In some cases, the predetermined time period may have a length of about 3 hours, about 6 hours, about 12 hours, about 18 hours, about 24 hours, or any other suitable length. In some instances, controller 32 may be adapted to restart timer 38, and thus restart the predetermined time period, if controller 32 receives an additional signal via the user interface 26, which would indicate occupancy of the space conditioned by the fan coil system 10.

Alternatively, or in addition, it is contemplated that the timer 38 may have a length that is calculated to end at a particular time of day. For example, if fan coil thermostat 24 is installed in a hotel room, the timer 38 may be adapted to expire at the checkout time of the hotel. In some cases, the timer 38 may have a length that is calculated to end at the particular day and the particular time that the guest is expected to check out. For example, if a guest is expected to check out in three days at 11:00AM, the timer 38 may be configured to expire on that day and at that particular time. In any of these cases, this may provide the guest with the comfort that they desire, while helping to not unnecessarily heat and/or cool a particular room once the room becomes unoccupied.

Figure 3:
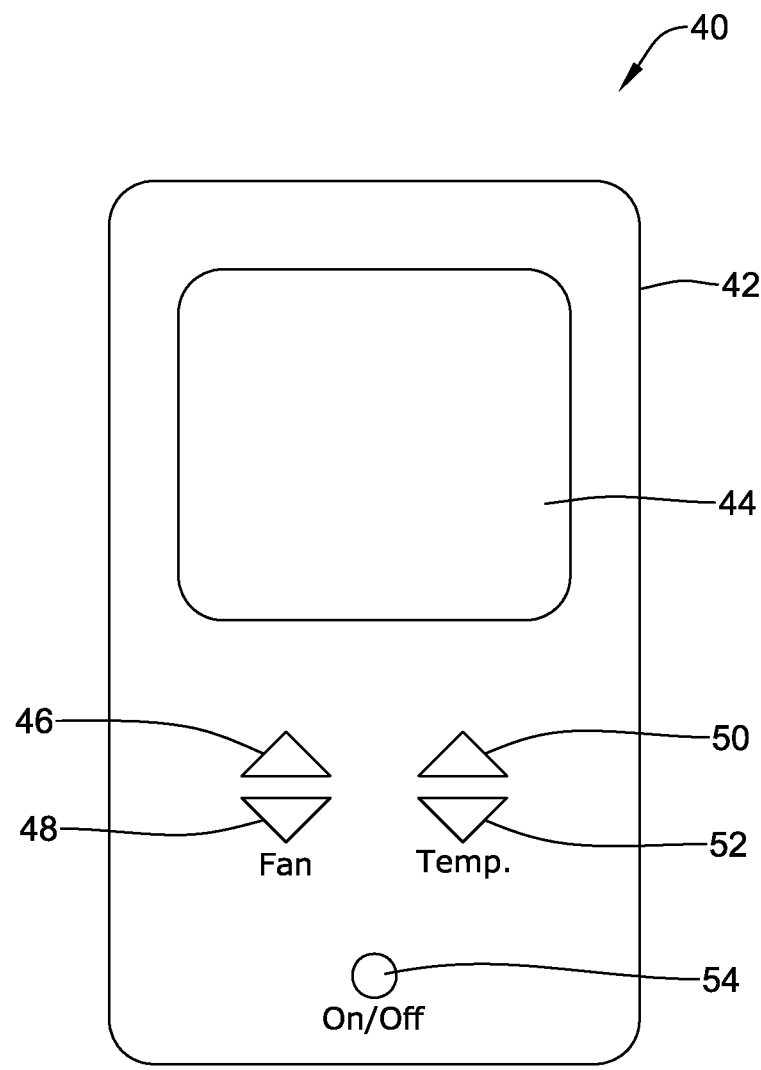
FIG. 3 is a front view of an illustrative embodiment of the fan coil thermostat of FIG. 2.

FIG. 3 is a front view of an illustrative fan coil thermostat 40. The illustrative fan coil thermostat 40 may be considered as an embodiment or perhaps as a particular example of fan coil thermostat 24 (FIG. 2). Fan coil thermostat 40 includes a housing 42 that may be formed of any suitable material such as molded plastic. Fan coil thermostat 40 also includes a display 44 that may be any suitable display such as an LCD display.

The illustrative fan coil thermostat 40 includes several buttons that may be considered as examples of keypad 30 (FIG. 2). The buttons illustrated are not to be considered as limiting in any way, but are merely provided to show examples of buttons that may be included. As illustrated, fan coil thermostat 40 includes a fan speed up button 46 and a fan speed down button 48. In some cases, it is contemplated that fan coil thermostat 40 may include a single fan speed button (not shown) that can be pressed repeatedly to step through the available fan speed settings. In some instances, a slider button or even a rotary dial may be provided to select a fan speed setting.

As illustrated, fan coil thermostat 40 includes a temperature up button 50 and a temperature down button 52. A user may select and/or alter a temperature setting by pressing temperature up button 50 and/or temperature down button 52, as appropriate. A power button 54 may also be provided. It is contemplated that fan coil thermostat 40 may instead have a touch screen LCD that provides the functionality of display 44 as well as fan speed up button 46, fan speed down button 48, temperature up button 50, temperature down button 52, and power button 54. In some cases, the various buttons may be provided as touch regions on the touch screen display.

Figure 4:
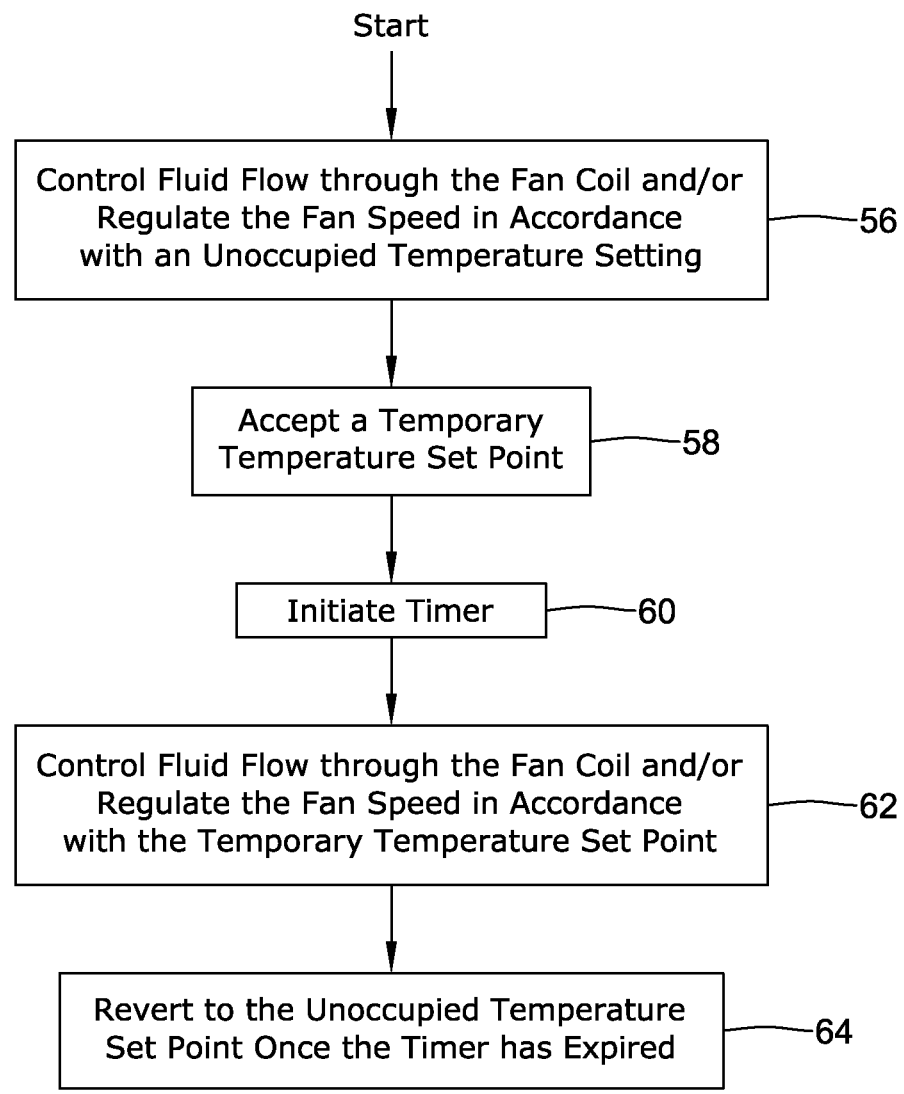
FIG. 4 is a flow diagram showing an illustrative method that may be carried out using the fan coil system of FIG. 1.

FIG. 4 is a flow diagram that shows an illustrative method that may be carried out by fan coil thermostat 24 (FIG. 2) and/or fan coil thermostat 40 (FIG. 3). At block 56, controller 32 (FIG. 2) controls fluid flow through fan coil 12 (FIG. 1) by controlling valve 22 (FIG. 1) and/or regulates a fan speed of fan 14 (FIG. 1) in accordance with an unoccupied temperature setting. At block 58, a temporary temperature set point is received from user interface 26 (FIG. 2), and then controller 32 initiates timer 38 (FIG. 2) as shown at 60, which in some cases, may include starting a countdown. The timer 38 may be adapted to expire at the end of a predetermined or other time period. Controller 32 may instruct timer 38 to restart if, for example, another temperature set point is entered via user interface 26.

Control passes to block 62, where controller 32 (FIG. 2) controls fluid flow through fan coil 12 (FIG. 1) by controlling valve 22 (FIG. 1) and/or regulates a fan speed of fan 14 (FIG. 1) in accordance with the temporary temperature setting. At block 64, controller 32 reverts back to the unoccupied temperature set point once timer 38 (FIG. 2) expires.

While the present disclosure has been described with respect to illustrative fan coil systems that include one or more pipes carrying heated water for heating and/or cooled water for cooling, it should be noted that the inventive concepts described herein are not limited to such systems. Some systems may be hybrid-type systems, with an A/C compressor for cooling and heated water for heating. Some systems may be through-the-wall systems, having one or more of a compressor for air conditioning, an electric or gas heating element for heating, and a heat pump. Fan coil thermostat 40 may, for example, be used with these systems as well as the systems described herein.

The present disclosure should not be considered limited to the particular examples described above, but rather should be understood to cover all aspects of the disclosure as fairly set out in the attached claims. Various modifications, equivalent processes, as well as numerous structures to which the present disclosure can be applicable will be readily apparent to those of skill in the art to which the present disclosure is directed upon review of the instant specification.

We claim:

1. A fan coil thermostat for use with a fan coil system, the fan coil thermostat comprising:
   a controller without a programmable schedule, the controller implementing a control algorithm that is configured to at least partially control one or more components of the fan coil system, the control algorithm defaults to controlling to an unoccupied temperature setting;
   a timer controlled by the controller;
   a user interface comprising one or more temperature adjustment buttons for increasing or decreasing a user-chosen temperature setting, the user interface configured to provide a signal to the controller when one or more of the one or more temperature adjustment buttons are operated by a user, the signal providing the controller with the user-chosen temperature setting and also providing the controller with an indication of current occupancy; and
   wherein, in response to the indication of current occupancy, the controller temporarily controls to the user-chosen temperature setting rather than the unoccupied temperature setting and initiates the timer, the controller returning to controlling to the unoccupied temperature setting once the timer expires.

2. The fan coil thermostat of claim 1, wherein the timer expires after about 12 hours.

3. The fan coil thermostat of claim 1, wherein the timer expires after about 24 hours.

4. The fan coil thermostat of claim 1, wherein the timer is configured to expire at a predetermined time of day.

5. The fan coil thermostat of claim 4, wherein the predetermined time of day corresponds to a checkout time.

6. The fan coil thermostat of claim 1, wherein the controller instructs the timer to restart if a subsequent indication of currently occupancy is received before the timer expires.

7. The fan coil thermostat of claim 1, further comprising a fan speed button.

8. The fan coil thermostat of claim 1, wherein the controller is configured to store the unoccupied temperature setting and to permit temporarily changing to the user-chosen temperature setting, but does not accommodate any other programmed temperature setback temperatures.

9. The fan coil thermostat of claim 8, wherein the controller is not configured to accommodate programmed temperature setback information pertaining to differing temperature set points corresponding to particular periods of time of a day.

10. The fan coil thermostat of claim 1, wherein the controller is configured to only control to the unoccupied temperature setting or temporarily at the user-chosen temperature setting.

11. The fan coil thermostat of claim 1, wherein the unoccupied temperature setting comprises a temperature set point chosen to conserve energy, the unoccupied temperature set point determined and set by a contractor or other maintenance personnel.

12. The fan coil thermostat of claim 11, wherein the temperature set point comprises a heating temperature set point or a cooling temperature set point.

13. A fan coil system, comprising:
   a fan coil configured for fluid communication with a source of heated fluid and/or a source of cooled fluid;
   a valve that controls fluid flow through the fan coil;
   a fan that blows air across the fan coil; and
   a fan coil thermostat, the fan coil thermostat including a user interface and a controller adapted to operate only at an unoccupied temperature setting or temporarily at a user-chosen temperature setting, the controller configured to maintain a temperature set point by controlling the valve, the fan, or the valve and fan;
   wherein the controller is programmed to accept the user-chosen temperature setting via the user interface, and, in response to accepting the user-chosen temperature setting, the controller temporarily changing the temperature set point from the unoccupied temperature setting to the user-chosen temperature setting, the controller maintaining the user-chosen temperature setting for a timed length of time before automatically returning to the unoccupied temperature setting, wherein the controller is configured to only control to the unoccupied temperature setting or temporarily at the user-chosen temperature setting.

14. The fan coil system of claim 13, wherein the fan coil thermostat further comprises a timer controlled by the controller.

15. The fan coil system of claim 14, wherein the controller, in response to receiving the user-chosen temperature setting from the user interface, initiates the timer.

16. The fan coil system of claim 15, wherein the controller changes from controlling to the user-chosen temperature setting back to the unoccupied temperature setting once the timer has expired.

17. The fan coil system of claim 13, wherein the timer is configured to expire after a period of time of between about 12 hours and about 24 hours.

18. A fan coil thermostat for use with a fan coil system, the fan coil thermostat comprising:
   a controller without a temperature setback schedule, the controller implementing a control algorithm that is configured to at least partially control one or more components of the fan coil system, the control algorithm defaults to controlling to an unoccupied temperature setting;
   a timer controlled by the controller;
   a user interface comprising one or more temperature adjustment buttons for increasing or decreasing a user-chosen temperature setting, the user interface configured to provide a signal to the controller when one or more of the one or more temperature adjustment buttons are operated by a user, the signal providing the controller with the user-chosen temperature setting and also providing the controller with an indication of current occupancy; and
   wherein, in response to the indication of current occupancy, the controller temporarily controls to the user-chosen temperature setting rather than the unoccupied temperature setting and initiates the timer, the controller returning to controlling to the unoccupied temperature setting once the timer expires.

19. The fan coil thermostat of claim 18, wherein the controller is configured to store the unoccupied temperature setting and to permit temporarily changing to the user-chosen temperature setting, but does not accommodate any other programmed temperature setback temperatures.

20. The fan coil thermostat of claim 18, wherein the controller is configured to only control to the unoccupied temperature setting or temporarily at the user-chosen temperature setting.

* * * * *